Fig. 1

Aug. 15, 1950            A. SIMMON            2,518,948
LIGHT MEASURING DEVICE FOR PHOTOGRAPHIC COLOR
PRINTING HAVING COLOR FILTERS AND
PHOTOCELL CIRCUIT TIMING MEANS Filed Feb. 1, 1949                                 6 Sheets-Sheet 2

INVENTOR:
Alfred Simmon
BY
Walter E. Wallheim
ATTORNEY.

Aug. 15, 1950  A. SIMMON  2,518,948
LIGHT MEASURING DEVICE FOR PHOTOGRAPHIC COLOR
PRINTING HAVING COLOR FILTERS AND
PHOTOCELL CIRCUIT TIMING MEANS
Filed Feb. 1, 1949  6 Sheets-Sheet 5

INVENTOR:
Alfred Simmon
BY
Walter E. Wallheim
ATTORNEY.

Patented Aug. 15, 1950

2,518,948

UNITED STATES PATENT OFFICE 2,518,948

LIGHT MEASURING DEVICE FOR PHOTOGRAPHIC COLOR PRINTING HAVING COLOR FILTERS AND PHOTOCELL CIRCUIT TIMING MEANS

Alfred Simmon, Jackson Heights, N. Y., assignor to Simmon Brothers, Inc., Long Island City, N. Y., a corporation of New York Application February 1, 1949, Serial No. 73,944

2 Claims. (Cl. 88—14)

The object of this invention is an improved device for measuring the intensities of three primary colors of light forming a projected colored image. More specifically this invention comprises an electrical and mechanical arrangement to improve the color response of a photoelectric cell by means of which these measurements are made. A device of this character can, for example, be used to improve the performance of a device for making color prints such as disclosed in Patent #2,438,303, issued to me on March 23, 1948.

In a device of this type it is known to measure the intensity of three primary colors of any point of a projected image, either simultaneously or successively, by placing a photo-electric cell on the point to be analyzed, and measuring the current which passes said photocell as a result of the light impinging upon it, said light having previously passed a filter of one of the primary colors. When these measurements are made simultaneously, a suitable beam splitting device and three filters and photocells are employed. Regardless as to whether these measurements are done successively or simultaneously, it is usually assumed that, first, the response of the photo-electric cell is substantially uniform for the three primary colors and, second, that the three filters are "sharp cutting" filters, i. e., a filter of one primary color completely excludes light of the two other primary colors. Neither of the two assumptions is met in practice with any degree of accuracy, and consequently very appreciable errors can afflict the measurements obtained under these circumstances. As a practical example, some of the more promising photo-electric cells are predominantly blue sensitive to such an extent that they are about ten times as sensitive to blue as to red light. Now, if we measure a point that is formed by a mixture of equal parts of blue and red light, and if the red filter transmits only as little as 5% of the blue light, an error as high as 50% in the final measurement can be made. If we measure points that contain relatively a low percentage of red, and a relatively high percentage of blue, the measurements can be completely falsified.

It is the purpose of this invention to provide an arrangement by which more nearly correct measurements of the three primary colors can be obtained even if photo-electric cells with unequal color response and filters which are not entirely "sharp cutting," are used.

Principle

In its broadest terms, the invention contemplates the correction of the measured intensity of one primary color in accordance with the measured intensity of at least one of the two other primary colors, or, more specifically, the deduction from the measured intensity of one primary color of a magnitude which is proportional to the measured intensity of at least one, and sometimes both, of the two other primary colors. This can, for example, be done by simultaneously measuring all three intensities and then impressing the three photo-electric cell currents upon a network which in effect solves three simultaneous equations and, therefore, delivers three corrected results. Such a device would comprise a beam splitter and three photo-electric cells.

Since the preferred type of photo-electric cell is a so-called photo-electric multiplier which has a superior sensitivity, such an arrangement would be quite expensive, since not only are the photo multiplier tubes expensive, but these tubes need a relatively expensive high voltage supply circuit. A more economical arrangement can be made, and this is the preferred embodiment of this invention, by utilizing a circuit such as disclosed in my aforementioned Patent #2,438,303, which makes those three measurements successively and which uses one photo-multiplier tube, one supply circuit, and one condenser. The current passing the photo-electric cell changes the voltage of the condenser by a predetermined magnitude, and the time elapsed for each color is measured and then constitutes a measure of the light intensity of that primary color. While it is in principle immaterial whether the condenser in a network of this type is charged or discharged, I prefer in practice to charge a condenser, since somewhat more convenient circuit conditions can be obtained in this manner. The time is most simply measured by means of a mechanical assembly which comprises a constant speed motor and a movable element which is moved by said motor during the charging period of the condenser. Under these circumstances, the desired correction can be accomplished by providing a shunt across the condenser which permits part of the charge accumulating in the condenser to bleed off, thereby prolonging the charging time which is being measured. The current admittance of the shunt must then be controlled in accordance with the light intensity of one or both of the two other primary colors. As a preferred shunt element, I use a second photo-electric cell which is in turn illuminated by at least one, and sometimes two independent sources of light. These sources of light are then regulated in accordance with the intensity of one or both of the two other primary colors. The light intensity of these primary colors must, of course, be multiplied by factors which depend upon the color sensitivity of the first mentioned photocell, and the respective transmission factor of the filter of one primary color for light of the two other primary colors. This regulation can be performed in a number of ways, for example, by means of a rheostat, or by means of a diaphragm interposed between these sources of light and said second photo-electric cell. In the preferred embodiment of this invention I use both means. The rheostat is used to adjust the brightness of the light in accordance with such factors as the sensitivity of the first photo-electric cell to light of the different primary colors, and in accordance with the respective transmission factors of a filter of one primary color to light of another primary color. The adjustable diaphragm is used to adjust the intensity of the light impinging upon the second photo-electric cell in accordance with the intensity of the light of a primary color other than the one being measured, and is for this purpose operatively connected to one of the movable elements which form part of one or the other of the time measuring devices previously described. This arrangement has the advantage that only one additional photo-electric cell is needed, and this additional cell may be of an inexpensive type of low sensitivity, since it can be illuminated without difficulty by a relatively strong source of light, as distinguished from the first photo-electric cell which must be adapted to measure the sometimes very low intensity levels of a projected image.

The invention is illustrated in the appended drawings in which

Fig. 11 shows, in addition to the aforementioned cross sectional view, a diagrammatical view of the optical system used to illuminate the aforementioned second photo-electric cell.

Like character of reference denote similar parts throughout the several views and the following specification.

General construction

Figure 1:
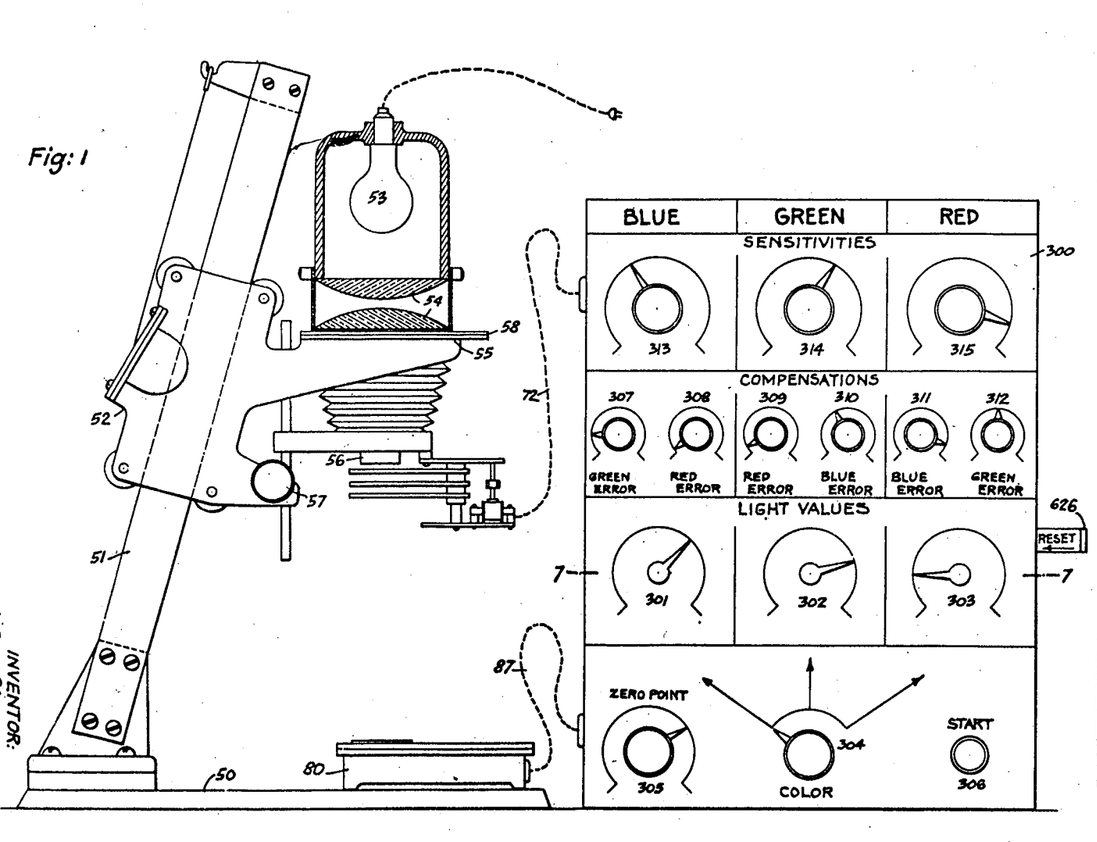
Fig. 1 shows the general appearance of the device.

The general construction of the device can be seen in Fig. 1. It consists physically of four principal parts, i. e., the printer, the filter unit, the photocell and the main unit. The main unit contains all component parts with the exception of those contained in the three other parts.

Printer

The printer may be of any convenient form or design, and merely as a matter of example, I have shown a more or less conventional enlarger which may be used for this purpose. This enlarger comprises a base or easel 50 on which a supporting structure 51 is mounted. During the actual printing exposure, a sheet of sensitized color print material is placed on this easel. The supporting structure may be vertical or, preferably, slightly inclined, as shown. Slidably arranged on this supporting structure is a carriage 52 which supports the projector. The main parts of this projector are a lamp 53, a condenser 54, a film stage 55, a lens 56 and a focusing movement 57. A transparency or negative 58 can be placed on the film stage. The distance of the lens 56 from the transparency 58 can be adjusted in the usual manner by means of the focusing movement 57 which may, for example, comprise a rack and pinion movement operated by a small handwheel. An electrically operated three color filter is placed in front of the lens 56.

Electrically operated three color filter

Figure 2:
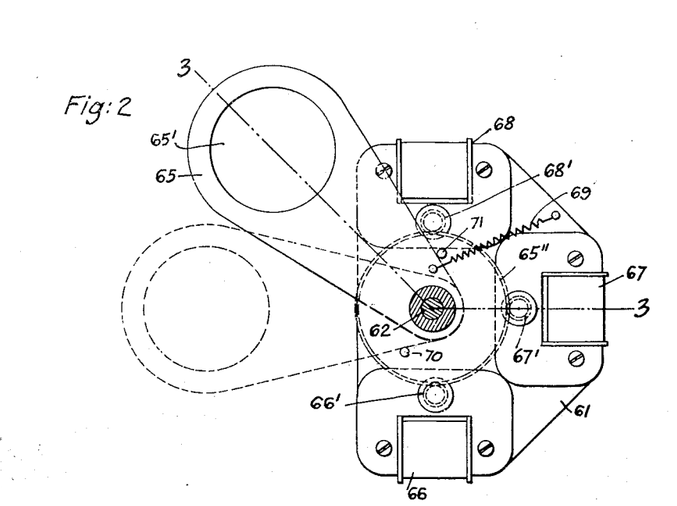
Figs. 2 and 3 are more detailed views of an electrically controlled three color filter.
Figure 3:
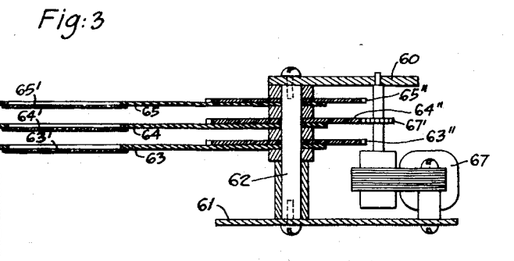
Figure 4:
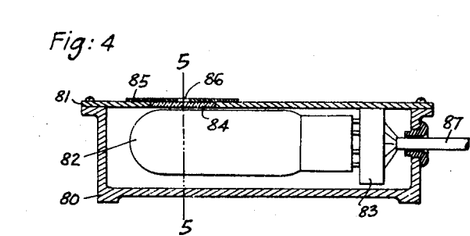
Figs. 4 and 5 are more detailed views of the photocell unit.

This unit can be seen in Fig. 1, in front of the lens 56, and has been shown in greater detail in Figs. 2 and 3. It consists of an upper plate 60 and a lower plate 61, Fig. 3, which are connected by a stud 62. Rotatably mounted on this stud are three filter holders 63, 64 and 65. These filter holders have a usually circular aperture which is covered, respectively, by three filters 63', 64' and 65' in different colors, usually made from gelatin or the like. Each filter holder is attached, respectively, to a gear 63'', 64'' and 65''. These gears are engaged, respectively, by small pinions 66', 67' and 68' which are driven by small motors 66, 67 and 68. These motors are mounted on the base plate 61 and are of the type which can be stalled for a long period of time without excessively overheating. Each filter holder is biased by a small spring 69 and assumes therefore ordinarily a position shown in solid lines in Fig. 2. As soon as one of the motors, however, becomes energized, it will turn one of the filters in a counter-clockwise direction, Fig. 2, until it assumes the position shown in dotted lines. The movement of the filter in both directions is restricted, respectively, by two small pins 70 and 71. A cable 72 connects the filter assembly to the main unit.

Photocell unit

Figure 5:
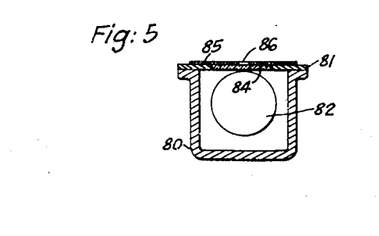
Figure 6:
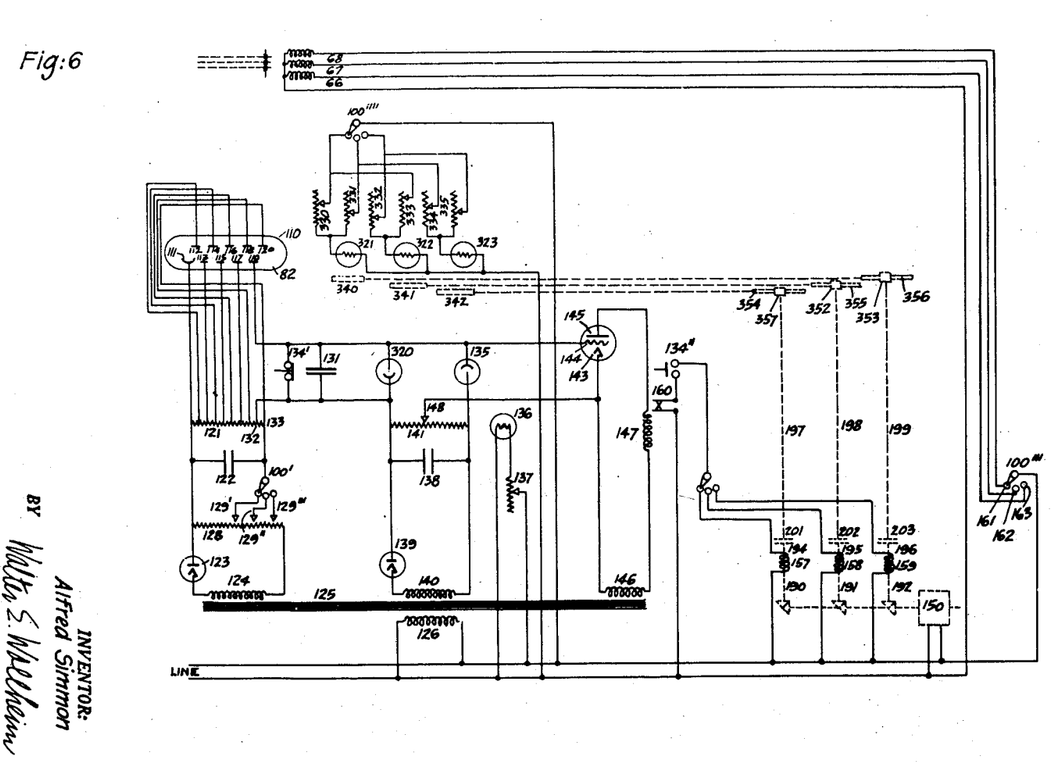
Fig. 6 is a circuit diagram.

The photocell unit can be seen on the baseboard 50 underneath the projector in Fig. 1, and is again shown in Figs. 5 and 6. It comprises a housing 80, which is covered by a top plate 81 and contains a photo-electric cell 82 mounted in the usual manner on a socket 83 similar to the socket used for radio tubes. The top plate 81 has a relatively large aperture 84 which is fitted with a piece of light diffusing glass or the like, and in front of this light diffusing medium is a thin cover plate 85 with a relatively small aperture 86. In practice, this aperture will be of the general magnitude of approximately $\frac{1}{4}$" diameter or less. The entire unit is connected by means of a flexible multiple conductor cable 87 to the main unit.

Main unit

The main unit as shown in Fig. 1 comprises a cabinet 300 of preferably rectangular shape with a front face carrying the various control elements such as handwheels and associated dials. As can be seen, the front panel is divided into three vertical sections labeled "Blue," "Green" and "Red." The upper row of controls 313, 314 and 315 serves to adjust the sensitivity of the photocell so that its sensitivity for the three primary colors becomes substantially uniform. The second row contains six handwheels with associated dials marked 307 to 312. By means of these controls the errors due to light of one color penetrating a filter of another color can be compensated. For example the blue light may be afflicted with a "green" and "red" error, which means that some green light and some red light will penetrate the blue filter and cause a photocell current which is unwanted and which tends to falsify the readings. Below this row of controls, there are three pointers 301, 302 and 303 which indicate on three dials the measured light values for the three colors. These pointers are driven by the movable elements which are part of the device measuring condenser charging times. Additional controls comprise a handwheel 305 by means of which the zero point of the device can be adjusted. This means that the condenser charging time for zero light intensity can be adjusted to a certain predetermined value. A push button 306 serves to start the measuring cycle, and a three step switch 304 makes it possible for the operator to select to which color, blue, green or red, this measuring cycle will apply. The entire device can be reset after the completion of a measuring cycle by means of a projection 626.

Electrical circuit—General characteristics

It has been pointed out above that the preferred circuit comprises a photo-electric cell of the so-called multiplier type, a supply circuit therefor and a condenser. The current that passes the photo-electric cell is substantially proportional to the intensity of the incident light. The charging time of the condenser, however, is inversely proportional to the current with which it is being charged and consequently, for a circuit of this type, charging times for the condenser for zero light intensity become infinite and for low light intensities these times become very long. This is objectionable because for very long charging times incidental small leakages may falsify the result. In order to overcome this condition I use an expedient which has already been disclosed in the aforementioned Patent 2,438,303 and which comprises the application of two independent charging circuits for the condenser. The current passing the first circuit is controlled by the photo-electric cell and is at least substantially proportional to the light intensity to be measured. The current passing the second circuit is constant and entirely independent of the light intensity but may, of course, for convenience, be adjusted to a suitable value where it will be left during the operation of the device. The result of this arrangement is that for zero light values, i. e., absolute darkness, a definite condenser charging time is obtained and that by this expedient convenient and efficient circuit conditions can be easily arranged.

Multiplier circuit

This circuit comprises a photo-electric cell of the electron multiplier type, a voltage divider and a source of direct current. The multiplier tube 82 comprises a transparent glass vessel 110, a photo sensitive cathode 111, and a number of electrodes 112, 113, 114, 115, 116, 117, 118, 119 and 120. Cathode 111 is the most negative of all elements within the multiplier tube, and a voltage of approximately 100 volts is impressed between this cathode and the next electrode 112 as well as between subsequent electrodes in such a way that the electrodes become increasingly more positive, electrode 120 being the most positive of all. In this manner the few electrons which are emitted from the photosensitive cathode upon exposure to light are attracted by the electrode 112 where they cause the emission of secondary electrons. The number of these secondary electrons is larger than the number of the primary electrons and the ability of the tube to "multiply" electrons is based on this fact. The secondary electrons emitted by electrode 112 are in turn attracted to the next electrode 113 where they cause the emission of still more tertiary electrons. This process is repeated in each stage so that finally a fairly heavy current flows between the last electrodes 119 and 120.

As can be noted from the circuit diagram, the cathode 111 and the various electrodes 112 to 120 are connected to corresponding taps of a voltage dividing resistance 121. The left side of this resistance which is connected to the cathode 111 must be of negative and the right side which is connected to the electrode 120 must be of positive polarity, and this voltage dividing resistance must be connected to a source of direct current which may, for example, be a battery. Merely as a preferred and convenient source of direct current, I have shown a condenser 122, a rectifying tube 123 and a transformer which consists of a secondary 124, iron core 125, and a primary 126 which is connected to a suitable power line 127' and 127''. In order to be able to adjust the voltage impressed on condenser 122, I provide an additional voltage dividing resistance 128. Three sliding contacts 129', 129'' and 129''' permit the adjustment of the voltage which will be impressed upon condenser 122. These sliding contacts are mechanically connected to the handwheels 313, 314 and 315 which have been shown in Fig. 1. Which of the three contacts determines this voltage depends upon the position of the three step switch 100'. This step switch is mechanically connected to similar step switches 100'', 100''' and 100''''. All of these switches are actuated in unison by the handwheel 304 on the front face of the main cabinet. By adjusting the position of the sliding contacts 129', 129'' and 129''', and selecting one of the contacts by means of switch 100', the total voltage impressed upon the multiplier can be adjusted and thereby, the light sensitivity of the device for the three colors can be readily controlled.

First condenser charging circuit

The condenser itself is shown as 131 and it is inserted into the last loop of the current supply of the multiplier tube. This last loop is formed by that part of the voltage divider which lies between points 132 and 133 and the respective connections between these two points and electrodes 120 and 119. The condenser is inserted into the wire which connects point 132 to electrode 119 rather than into the wire which connects point 123 to the electrode 120. In this manner the condenser receives the most convenient polarity condition which permits its subsequent connection to a thyratron tube which, in turn, indicates when this condenser becomes charged to a predetermined voltage. Parallel to this condenser is a switch 134' which is normally closed, and which, therefore keeps this condenser shortened, so that it is completely discharged before the start of the measuring cycle. This switch is mechanically connected to a similar switch 134'', and both are actuated by push button 306 which is shown in Fig. 1.

*Second charging circuit for condenser*

The second charging circuit is parallel to the first charging circuit and charges this condenser with a constant current, independent of the light conditions which prevail at the photo multiplier tube. It is, therefore, necessary to provide an element within this circuit which passes a constant current, and it must pass this constant current regardless of the fact that the condenser voltage itself rises during the charging process. A simple resistance is, therefore, unsuitable since it would not keep the charging current constant in spite of the rising condenser voltage. Under certain conditions a screen grid tube would fill this requirement since a screen grid tube in the proper circuit keeps its plate current substantially constant over a fairly wide range of plate voltages. As a preferred means of a constant current element, I use a third photo-electric cell illuminated by an independent lamp with a constant light output. It must be kept in mind that the first photo-electric cell is the one which is placed on the easel of the enlarger for measuring purposes, and that the second photo-electric cell is the one which is used as a shunt across condenser 131 in order to prolong its charging time. It must be emphasized that this third photo-electric cell and this second lamp have no connection whatsoever with the light output of the printer and that they merely serve as a convenient constant current element.

This circuit is shown as part of Fig. 6. The third photo-electric cell is called 135 and is illuminated by a small lamp 136. The light output of this lamp can be adjusted by a rheostat 137 which is actuated by handwhel 305 shown in Fig. 1. The adjustment of this rheostat thereby controls the light impinging upon the third photo-electric cell 135 and permits the operator to adjust the charging time of condenser 131 to a definite value when no light impinges upon the first photocell 82.

A suitable D. C. voltage is impressed through photocell 135 on the condenser 131. This voltage again may be derived from any suitable D. C. source, for example, a battery, and again as a matter of convenience, I provide a condenser 138 which is charged throuh a rectifying tube 139 by the secondary coil 140 of a transformer. Rather than use a second transformer, this secondary coil 140 is arranged on the same iron core 125 serving already for the secondary coil 124 which energizes the photo multiplier circuit. A resistance 141 is arranged across terminals of condenser 138. The left side of condenser 138 and resistance 141 is of negative and the right side, of course, is of positive polarity.

*Means to prolong the condenser charging time*

As has already been pointed out, the preferred means to prolong the condenser charging time are formed by a shunt element across condenser 131. The preferred shunt element in turn is a second photo-electric cell 320, Fig. 6, which is illuminated by at least one, and sometimes two, incandescent lamps which are schematically shown as 321, 322 and 323.

The brightness of these lamps is controlled by two independent means. The first means are formed by a series of rheostats 330 to 335 which are actuated by the handwheels 307 to 312 shown in Fig. 1. In the interest of simplicity, the sequence of the rheostats 330 to 335 as shown in Fig. 6 is not the same as that of the handwheels 307 to 312 as shown in Fig. 1. The second means comprise three diaphragms with adjustable apertures which are schematically shown in Fig. 6 in dotted lines as 340, 341 and 342.

The rheostats are selectively controlled by a three step switch 100''''. This switch is mechanically connected, for example, mounted on the same shaft, with the other three step switches 100', 100'' and 100''', and is actuated by handwheel 304, Fig. 1. It is the purpose of these rheostats to adjust the brightness of the respective lamps in accordance with such factors as the color sensitivity of the first photocell 82 and the transmission factor of one of the three color filters for light of a primary color other than its own. In the position shown in Fig. 6, the brightness of lamp 321 is controlled by the rheostat 330, and the brightness of lamp 322 is controlled by rheostat 333. Lamp 323 receives no current. In the second position, lamp 321 would depend upon rheostat 331, and lamp 323 would depend upon rheostat 334. Lamp 322 would be de-energized. In the extreme right position of switch 100'''', lamp 321 would be currentless, and lamp 322 and 323 would, respectively, be controlled by rheostats 332 and 335. The purpose of this arrangement is that, for example, in the position shown in Fig. 6, lamp 321 is adjusted in accordance with the transmissivity of the blue filter for red light and in accordance with the sensitivity of the photocell for red light, and lamp 322 is adjusted in accordance with the transmissivity of the blue filter for green light and in accordance with the sensitivity of the photocell for green light. On the front face of this main unit, Fig. 1, these factors have been called, respectively, the "green" and the "red" error with which the measurement of the blue light intensity is afflicted. The other rheostats 332 to 335 serve corresponding purposes but, of course, for correspondingly different color combinations.

It is the purpose of the adjustable diaphragms 340, 341 and 342 to adjust the quantity of light reaching the second photocell 320 in accordance with the intensity of light of a primary color other than the one being measured. For that reason, these adjustable diaphragms are, respectively, in mechanical connection with the moving elements of the time measuring devices to be described below. For example, diaphragm 340 is connected by means of a rack and pinion to shaft 199 which forms part of the extreme light measuring device. Likewise diaphragm 341 is actuated by shaft 198, and diaphragm 342 is actuated by shaft 197.

It can, therefore, be seen that, by the coaction of the selected rheostats and adjustable diaphragms, a quantity of light reaches the second photocell 320 which is proportional to the factors of color sensitivity and filter transmissivity as adjusted by both rheostats which are in the circuit, depending upon the position of switch 100'''', and in accordance with the settings of the two adjustable diaphragms in front of the two energized lamps which are in turn adjusted by the movable elements of the mechanical time measuring devices which are to be described in a later paragraph.

*Thyratron-relay circuit*

The purpose of this circuit is to provide means to indicate when the voltage of condenser 131 has reached a predetermined critical value. It consists of a thyratron tube 142, with a cathode 143, a grid 144, and an anode 145. This thyratron is energized by alternating current derived from a secondary coil 146 which is preferably, but not necessarily, mounted on the same iron core 125 as the two other secondaries 124 and 140 described above. The plate circuit of the thyratron is completed by a relay coil 147 which is part of a relay to be described later. The grid of the thyratron is connected to the positive terminal of the condenser 131 and, to complete the grid circuit, the cathode 143 is connected to a sliding contact 148 of resistance 141. Thus the voltage of the thyratron grid 144 with respect to the cathode 143 consists of the voltage impressed upon the left part of the resistance 141 and of the voltage impressed upon condenser 131. The two voltages are, as can be easily seen, of opposite polarity. A thyratron is usually non-conductive as long as its grid voltage with respect to that cathode is more negative than —2 volts, and it becomes current conducting as soon as the grid voltage is less than —2 volts negative with respect to the cathode. The result of this arrangement is that as soon as the condenser voltage is more than 2 volts larger than the voltage of the left half of resistance 141, the previously non-current conducting thyratron becomes current conducting, whereupon current begins to flow in relay coil 147.

*Charging time measuring circuit*

This circuit consists of a constant speed motor 150, preferably a synchronous motor, which drives, through a system of gears, three shafts 190, 191 and 192. Each shaft is connected to a clutch disc 194, 195, and 196 which cooperate with opposing discs 201, 202 and 203. These clutches are normally open, i. e., the extensions of shafts 190, 191 and 192 which are designated 197, 198 and 199, and which carry discs 201, 202 and 203, are normally stationary. The three clutches are actuated by three electromagnets 157, 158 and 159. Which one of these electromagnets is in the circuit depends upon the position of a triple switch 100''. This switch is mounted on the same shaft as the other triple switch 100' which is part of the circuit of the photo multiplier tube, and the two are thereby actuated in unison. In series with this switch is a normally open push button 134'' which is mechanically connected to 134' and a normally closed contact 160 which is energized by the aforementioned relay coil 147.

*Control circuit for three color filter*

The circuit is completed by a triple switch 100''' also mounted on the same shaft as 100', 100'', and 100'''', so that the four switches are actuated in unison. The center point of switch 100''' is connected to one end of the line, and the three contacts 161, 162 and 163 are connected to the three armatures of the motor 66, 67 and 68 which form part of the three color filter unit described above.

*Mechanical part of light measuring device*

This unit has already been shown schematically in Fig. 6 in connection with the circuit diagram.

Its actual construction and appearance is shown in detail in Figs. 7, 8, 9, and 10. It comprises a base 180 which supports all other components. The constant speed motor 150 drives, by means of worm 181 and worm gear 182, a transverse shaft 183. Mounted on this transverse shaft are worms 184, 185 and 186 which, respectively, engage worm gears 187, 188 and 189. These worm gears are mounted on hollow shafts 190, 191 and 192, respectively. These hollow shafts run in ball bearings and carry at their respective front ends clutch discs 194, 195 and 196. Rotatably mounted within the hollow shafts 190, 191 and 192 are solid shafts 197, 198, and 199. These shafts carry at the front ends smaller clutch discs 201, 202, 203, respectively, which are adapted to be engaged by the larger clutch discs 194, 195 and 196. For this purpose, sufficient axial play is permitted for the shafts 197, 198 and 199 so that by a small axial movement the two parts of the clutch can come in contact. Fastened to the front ends of these solid shafts are three ratchet gears 204, 205, 206, three gears 207, 208 and 209, and three pointers 301, 302 and 303 which already have been shown in Fig. 1. The ratchet gears are part of the resetting mechanism to be described below. The gears 207, 208 and 209 are not strictly needed for the invention as disclosed in this application, but merely serve the purpose to connect a device as described to a device for making color prints, as disclosed in my Patent #2,438,303, since this is a preferred application of this invention.

The cylindrical parts connecting the clutch discs 201, 202 and 203 to the ratchet gears 204, 205 and 206, respectively, are constricted at one point, forming a narrow cylindrical groove. Into this cylindrical groove fit levers 210, 211 and 212. The shape of these levers can best be seen in Fig. 9. They are supported on their right side by pivots 213, 214 and 215, and their left ends 216, 217, and 218 and are, respectively, connected to solenoids 157, 158 and 159 or, more accurately, to their armatures 224, 225 and 226. The electrical connection of these solenoids have already been shown in the diagram in Fig. 6. The levers 210, 211 and 212 have projections 220, 221 and 222 which fit into the aforementioned grooves between the respective clutch discs and ratchet gears. Whenever one of the solenoids is energized, it will, of course, attract its armature, thereby rotating the corresponding lever 210, 211 or 212 slightly and forcing the entire assembly attached to one of the solid shafts 197, 198 and 199 to perform a small axial movement. During operation the constant speed motor 150 revolves constantly thereby driving the three worm gears 187, 188 and 189 and the connected clutch discs 194, 195 and 196. The respective opposite clutch discs 201, 202 and 203, however, are ordinarily not in contact with them and, thereby, these clutch discs, as well as all the elements connected to the solid shafts 197, 198 and 199, are ordinarily stationary and not rotating. However, as soon as one of the solenoids 157, 158 or 159 becomes energized, it will atttract its armature thereby swiveling lever 210, for example, bringing clutch disc 201 in contact with clutch disc 194, whereupon shaft 197 begins to rotate. As soon as the solenoid is deenergized, a spring, not shown, will separate the two clutch discs, whereupon the solid shafts and all elements connected to them will cease to rotate.

Figure 10:
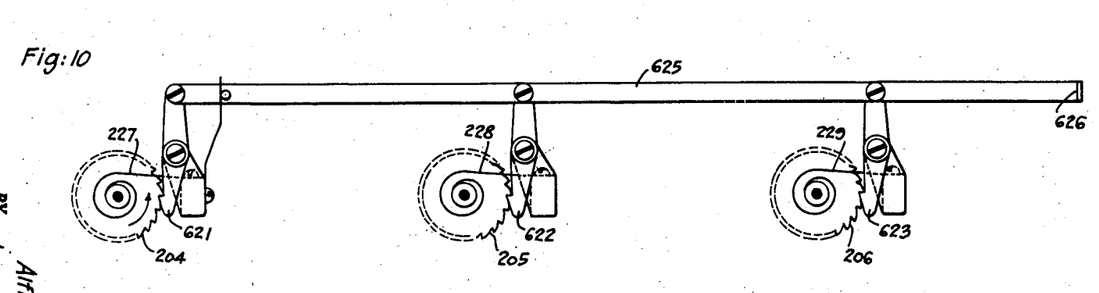

Special provisions must be made to reset the shafts 197, 198 and 199 after they have been actuated in the manner described above, so that for the next set of measurements they again start from zero. This resetting mechanism is shown in Fig. 10. The ratchet gears 204, 205 and 206 are again shown. They are in operative contact with ratchet levers 621, 622 and 623. The ratchet gears are rotating, when energized, through the clutches in a counter-clockwise position. As soon as a clutch is deenergized, one of the shafts will, of course, come to rest and remain there until the operator sees fit to reset the three movements. For this purpose, the upper ends of ratchet levers 621, 622 and 623 are connected by a common bar 625. The right end 626 of this bar protrudes through a slot in the housing of the main unit. Small torsion springs 227, 228 and 229 are attached to the three ratchet gears. These torsion springs tend to rotate the ratchet gears in a clockwise position, and it will be clear that during rotation of the ratchet gears by the clutches these torsion springs will be more or less tensioned. Resetting is, therefore, simply achieved by the operator by pressing the right end 626 of bar 625 in the direction of the arrow, i. e., from right to left. This will disengage ratchet levers 621, 622 and 623 from contact with their respective ratchet gears 204, 205 and 206, whereupon the torsion springs 227, 228 and 229 will reset the ratchet gears and, thereby, all elements mounted on the solid shafts 197, 198 and 199.

Figure 7:
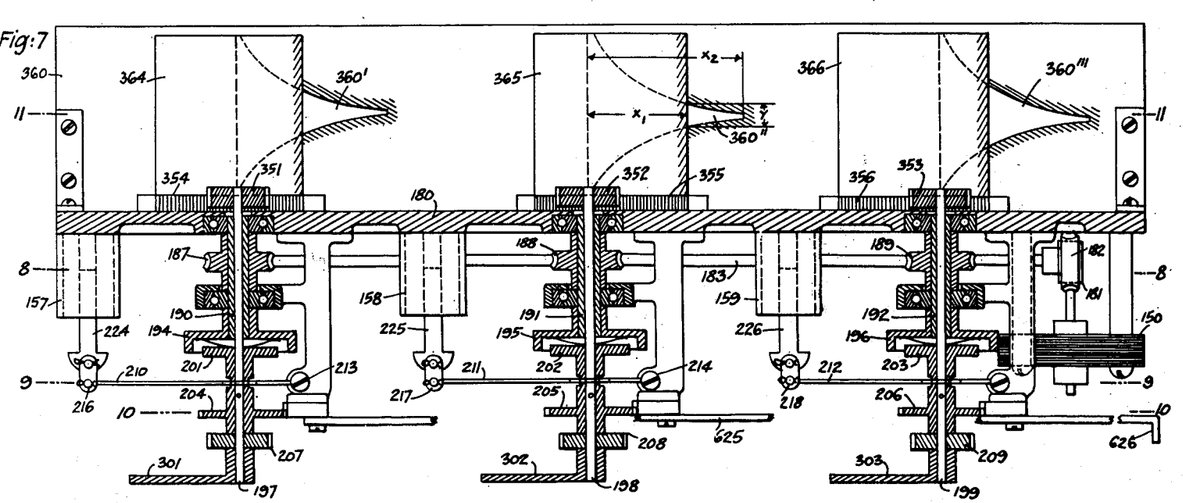
Fig. 7 is the time measuring device as seen in plane of line 7—7, indicated in Fig. 1.
Figure 8:
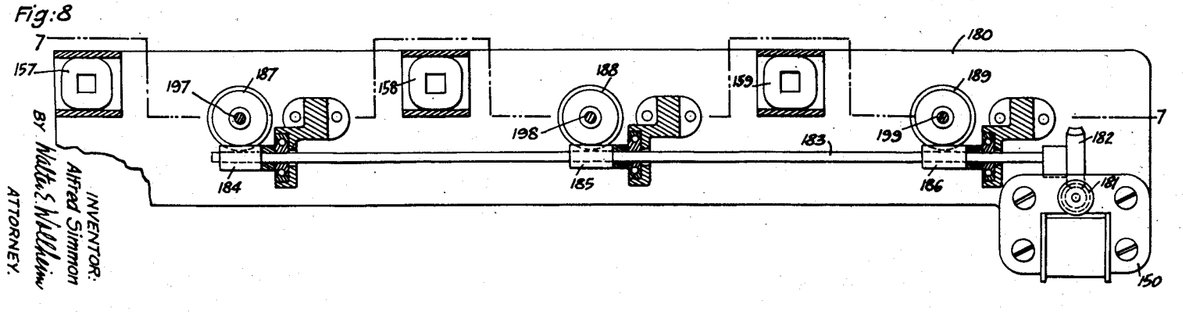
Figs. 8, 9, 10 and 11 are additional cross sectional views through this time measuring device, respectively, in planes of lines 8—8, 9—9, 10—10 and 11—11, indicated in Fig. 7.
Figure 9:
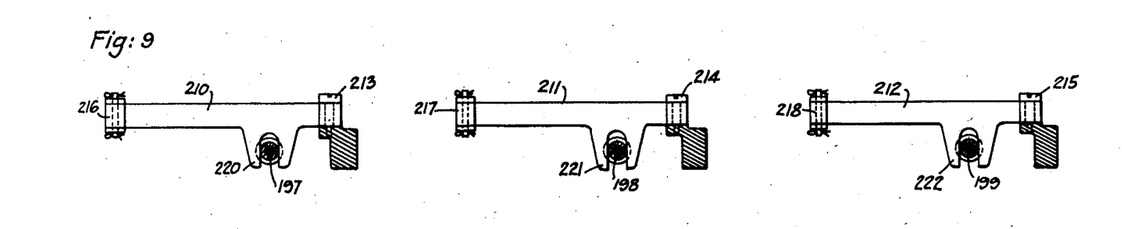
Figure 11:
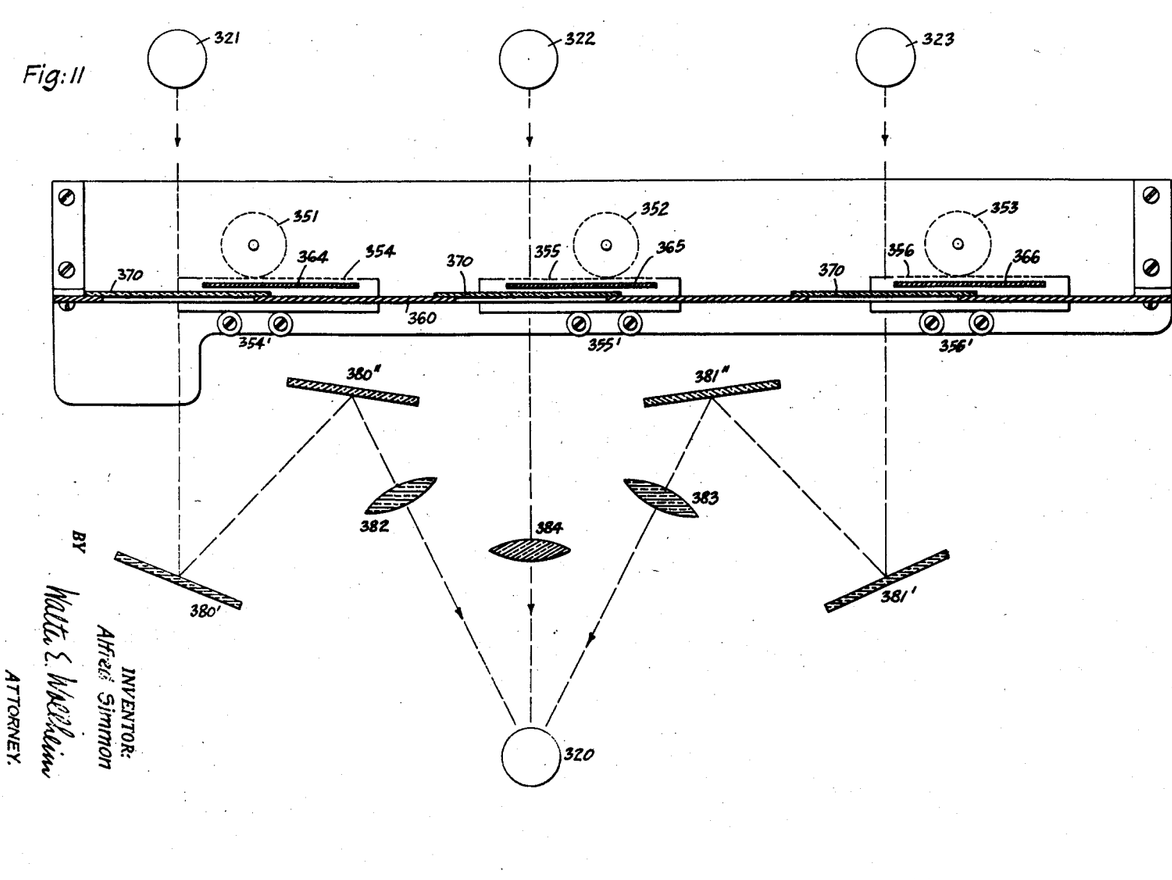

It has already been stated that operatively connected to the three time measuring devices there are diaphragms with adjustable apertures which control the light impinging upon the second photocell 320. These adjustable diaphragms are shown in detail in Figs. 7 and 11. Each adjustable diaphragm consists of two principal parts, a fixed member with an aperture of peculiar shape and a relatively movable member of rectangular configuration. In the example shown in Fig. 11, the three stationary members are combined into one member 360 having three apertures 360', 360'' and 360'''. Each of these apertures is covered with a light diffusing member, for example, with a piece of ground glass 370. These diffusing members are visible in Fig. 11. The three rectangular members are 364, 365 and 366. In order to connect these movable members operatively to the time measuring device, three gears 351, 352 and 353 are, respectively, attached to the shafts 197, 198 and 199. These gears impart a straight motion to three racks 354, 355 and 356 which are seen in Fig. 7 and also in cross section in Fig. 11. As can be seen in Fig. 11, the racks are supported, respectively, by two rollers each, 355' and 356'. The movable members 364, 365 and 366 are, respectively, attached to the corresponding racks 354, 355 and 356. It can be understood from Fig. 7 that the movement of any of the three time measuring devices, or more specifically, a rotation of any of the shafts 197, 198 and 199 causes, by means of the rack and pinion movement formed by 351 and 354, or 352 and 355, or 353 and 356, respectively, a movement of one of the rectangular diaphragm members 364, 365 or 366 with respect to the member 360, or more specifically with respect to one of the apertures 360', 360'' or 360'''. The longer the charging time of the condenser 131 becomes, the farther one of these shafts will rotate, causing a corresponding straight line movement of one of the members 364, 365 and 366 in the direction from left to right, thereby causing these members to cover more and more of the corresponding apertures in member 360. This reduces the amount of light impinging upon the second photocell 320.

That the coaction of the component parts, as described above, brings about the desired result can be seen by the following reasoning: The charging time of condenser 131 decreases with increasing intensity of the light impinging upon photocell 82. Therefore, a high light intensity of one primary color means a short charging time of this condenser. The opening of the diaphragm actuated by the device which measured this charging time is large, in fact, theoretically infinite at the beginning of this charging time, and is gradually covered during the charging time, until at the end of it, the blade which covers the aperture comes to a standstill. Consequently the light passing this diaphragm is of relatively high intensity, if the intensity of the light which is measured by the time measuring device actuating this aperture is also high. This in turn means a high shunt current passing photocell 320 which is illuminated by the light passing the diaphragm aperture, and this in turn means that the charging time of condenser 131 for the next primary color is correspondingly prolonged. This in turn offsets the unwanted contribution made to the illumination of photocell 82 by light of a primary color other than the one being measured.

The optical system by means of which the light of the three lamps 321, 322 and 323 falls upon the photocell 320 is shown in Fig. 11. The lamp 322 in the middle is positioned directly above the photocell 320, and the adjustable diaphragm formed by members 365 and 360 is positioned somewhere on the connecting line between lamp and photocell. It may be desirable to arrange a light collecting lens 384 at some suitable point between diaphragm and photocell. This lens should be focused in such a way that an image of the diaphragm opening is projected into the photo-electric cell. It must be kept in mind that, due to the diffusing member 370, the diaphragm now becomes the acting source of light with respect to the photocell.

The light of the two other lamps 321 and 322 can be directed towards the photocell by means of reflectors 380' and 380'', if desired in cooperation with additional lenses 382 and 383. Since the optical path between the two outer diaphragms formed, respectively, by members 364 and 366 and the common member 360, is longer than the path of the light which falls from the diaphragm in the middle upon photocell 320, the two outer lamps 321 and 323 must be correspondingly stronger than the center lamp 322.

*Mathematical relations and shape of diaphragm aperture*

In the following discussion, definite sensitivities for red, green and blue light, respectively, have been assigned to the photocell 82 which is placed on the easel of the enlarger. This is an over simplification, because each color comprises a group of wave lengths, and the photo-electric cell has, even within this group, different sensitivities; for example, a red filter may pass light between limits of 5800 and 7000 angstrom units, but the sensivity of the photocell for 5800 may be several times as high as for 7000. To this extent the assumption of a definite sensitivity of the photocell for the primary colors is inaccurate, but in reality this simplification is, in this particular case, permissible because it is the purpose of the device not to analyze natural objects which may be composed at random of light of all wave lengths, but rather to analyze photographic color transparencies which are generally composed of three layers, each of which passes light of a definite spectral composition. In other words, the average red, green and blue occurring in color transparencies is always a mixture of various wave lengths in substantially the same proportions and, therefore, the simplified assumption on which the following discussion is based, appears to be permissible.

The current passing the first photocell, or more specifically, the current passing the wire connecting point 132 of potentiometer 121 and electrode 119, under ideal conditions, particularly with ideally "sharp-cutting" filters, can be expressed as follows:

$$i_{R_0} = S_R t_{RR} L_R \qquad (1)$$

$i_{R_0}$ is the ideal or correct photocell current caused by red light, expressed in $\mu a$.

$S_R$ is the photocell sensitivity to red light, usually expressed in $$\frac{\mu a}{\text{Foot Candles}}$$

$t_{RR}$ is the transmission factor of the red filter to red light. This is a dimensionless figure which is smaller than unity.

$L_R$ is the intensity of the red light, in foot candles, or equivalent units.

Similarly, the ideal photocell current for green and blue light is represented by $$i_{G_0} = S_G t_{GG} L_G \qquad (2)$$

$$i_{B_0} = S_B t_{BB} L_B \qquad (3)$$

Under actual conditions the photocell current is considerably larger, since the filters are not sharp cutting and since, therefore, for example, some blue light passes the red filter and causes an additional photocell current.

The actual photocell current is $$i_R = S_R t_{RR} L_R + S_G t_{RG} L_G + S_B t_{RB} L_B \qquad (4)$$

$i_R$ is the actual uncorrected photocell current caused by light of all colors passing the red filter.

$S_R$, $S_G$, and $S_B$ are, respectively, the photocell sensitivities for red, green and blue light, again expressed in $$\frac{\mu a}{\text{Foot Candles}}$$

$t_{RR}$, $t_{RG}$ and $t_{RB}$ are the transmission factors of the red filter to light of red, green and blue color, respectively.

All transmission factors are smaller than unity; for example $t_{RR}$, for a typical red filter is .90, which means that about 90% of the red light is passed. $t_{RG}$ may, for example be .07 which means that 7% of the green light passes the red filter, and $t_{RB}$ may be .05, meaning that 5% of the blue light is transmitted by the red filter.

$L_R$, $L_G$ and $L_B$ are, respectively, the light intensities for red, green and blue.

Formulae 1, 2, 3 and 4 can be combined to read $$i_{R_0} = i_R - \left( \frac{t_{RG}}{t_{GG}} i_{G_0} + \frac{t_{RB}}{t_{BB}} i_{B_0} \right) \qquad (5)$$

In other words, the correct "red" photocell can be obtained by deducting from the actual red photocell current the two expressions within the bracket.

We shall now contemplate the charging circuit of condenser 131. This is formed by three parts, first, the photocell 82, or more specifically the branch of its supply circuit between 132 and 119; second, the second photocell 320; and third, the third photocell 325 with the associated supply circuit. The third part serves merely the purpose of establishing a definite charging time for the condenser when the incident light intensity upon the first photocell becomes zero. The first photocell and the second photocell, however, form a network which is supposed to pass the correct photocell currents; for example, in the case of red light, the current passing the combination should be $i_{R_0}$.

Both photocells are parallel, but conduct current in opposite directions. The total current passing this network, therefore, equals the difference which in turn should equal $i_{R_0}$, $i_{G_0}$ or $i_{B_0}$, respectively.

The current passing the first photocell 82, of course, represents the uncorrected photocell currents $i_R$, $i_G$ and $i_B$, respectively. The current passing the second photocell 320, consists of two parts, caused, respectively, by light of two lamps to which the second photocell is exposed. The light of these lamps is modified in accordance with the aperture of two diaphragms which are mounted, respectively, in front of these lamps. Each component is, therefore, proportional to the brightness of one lamp multiplied by the area of the diaphragm aperture in front of said lamp. For example, in the case of red light, the current passing the network formed by the first two photocells can be expressed by the following formula:

$$i_{R_0} = i_R - b B_{G1} a A_G + b B_{B1} a A_B \qquad (6)$$

$A_G$ is the area of the diaphragm controlled by the "green" time measuring device, i. e., the device which measured the charging time of condenser 131 when the first photocell is exposed to green light.

$A_B$ is the area of the diaphragm controlled by the "blue" time measuring device.

$B_{G1}$ is the brightness of the lamp behind the diaphragm controlled by the "green" time measuring device.

$B_{B1}$ is the brightness of the lamp behind the diaphragm controlled by the "blue" time measuring device.

The suffix "1" for the two last named magnitudes is necessary, because the brightness of either lamp may assume two different values since, depending upon the position of switch 100'''', each lamp may be controlled either by one or the other of the family of rheostats 330 to 335.

$a$ and $b$ are proportionality factors.

Formulae 5 and 6 can be reconciled, if we made $$b B_{G1} \cdot a A_G = \frac{t_{RG}}{t_{GG}} i_{G_0} \quad \text{and} \quad b B_{B1} \cdot a A_B = \frac{t_{RB}}{t_{BB}} i_{B_0} \qquad (7)$$

The easiest way to do this, is to make $$b B_{G1} = \frac{t_{RG}}{t_{GG}} \qquad (8)$$

and
$$bB_{G1} = \frac{i_{RB}}{i_{BB}} \quad (9)$$
and
$$aA_G = i_{G_0} \quad (10)$$
and
$$aA_B = i_{B_0} \quad (11)$$

The Formulae 8 and 9 mean that the brightness of the lamps by means of two of the rheostates 330 to 335 must be properly adjusted. The significance of the last two Formulae 10 and 11, however, is that they can be used to determine the proper shape of the diaphragm aperture. This can be done by expressing, for example, $A_G$, the diaphragm area, as well as $i_{G_0}$, the correct green photocell current, as functions of a common parameter $x$ which represents the travel of one of the movable elements of one of the time measuring devices, for example of element 365. Referring to Fig. 7, the open area of the diaphragm aperture can be expressed in a system of rectangular coordinates as $$A_G = \int_{x=x_2}^{x=x_1} y\,dx \quad (12)$$

In order to express $i_{G_0}$ as the function of $x$, we have to compute first the charging time of the condenser 131. If we call E the critical condenser voltage, i. e., the voltage which is just high enough to render thyratron 142 current conducting, C, the capacity of condenser 131, $T_G$ the charging time for green light as measured by the "green" time measuring device, and $i_3$ the current passing the third photocell 135, we have $$E = \frac{T_G}{C}(i_{G_0} + i_3)$$

This can be transformed to read $$T_G = \frac{\frac{EC}{i_3}}{\frac{i_{G_0}}{i_3} + 1}$$

For zero light intensity, $i_{G_0}$ becomes zero, and the charging time of condenser 131 is then called $T_0$.

$$T_0 = \frac{EC}{i_3}$$

therefore, $$i_{G_0} = i_3\left(\frac{T_0}{T_G} - 1\right)$$

$x$ is directly proportional to $T_g$, and we shall call the proportionality factor $f$, i. e., $x = fT_g$. We therefore have $$i_x = i_3\left(\frac{fT_0}{x} - 1\right) \quad (13)$$

Formulae 10, 12 and 13 can be combined:

$$a\int y\,dx = i_3\left(\frac{fT_0}{x} - 1\right)$$

This can be differentiated, resulting in $$ay\,dx = -\left(\frac{i_3 fT_0}{x^2}\right)\cdot dx$$

or $$y = -\left(\frac{i_3 fT_0}{a}\right)\cdot\frac{1}{x^2} \quad (14)$$

This represents the width $y$ of the aperture at any given point as a function of the distance $x$. The minus sign signifies that $y$ decreases when $x$ increases. It will be seen that for $x=0$, $y$ becomes infinite, but in practice is, of course, impossible. This, however, is of no practical significance, since $x$ will become 0 only for infinite light intensities impinging upon the first photocell which in reality, of course, does not happen. The actual shape of an aperture complying with Formula 14 is shown in Fig. 7.

Operation

Before discussing the operation of the device in detail, I shall describe briefly the train of electrical and mechanical events which together constitute a light measuring cycle, because a relatively large number of these cycles occur during the operation of the device. For the time being I shall assume that the means to prolong the charging time of condenser 131 or, more specifically, the second photo-electric cell 320, is made in some manner inoperative, for example by preventing any light of the three lamps 321, 322 and 323 from falling upon it. For example, we may assume that blue light impinges upon photocell 82 causing a current to flow between points 132 and 110, thereby charging condenser 131. This condenser is already being charged by the second charging circuit which includes the third photocell 135. The coaction of both charging circuits results in a charging time for condenser 131 which is shorter than $T_0$, and this charging time is indicated by pointer 301 which, on a suitable scale, indicates directly the intensity of the measured blue light. From circuit diagram Fig. 6, it is quite clear what happens within the circuit electrically. The grid 144 of thyratron 142 has a normally negative voltage with regard to its cathode, thereby preventing current from passing between the cathode 143 and the anode 145. As soon as the negative voltage of the grid 144 with respect to the cathode 143 is reduced to a critical value, usually 2 volts, the thyratron becomes current conducting and this in turn causes relay 147 to open the normally closed contact 160. During the charging time the movement of motor 150 is transferred by clutch 201 to the "blue" time measuring device but, as soon as contact 160 opens, this mechanical connection is interrupted and shaft 197, and therewith pointer 301, come to a standstill.

The operation of the device can be divided in two parts. During the first part, the device is adjusted for the various constants, and in the second part, actual measurements are made on color transparencies.

The adjustment of the device is done in three stages, concerning, respectively, the zero point, the sensitivity to three primary colors, and the compensation for the various errors caused by light of one color penetrating a filter of another color.

The adjustment for zero merely means that the charging time of condenser is adjusted to a definite value $T_0$ when no light impinges upon photocell 82. For that purpose the photocell 82 is covered, or the light in the enlarger is turned off, and push button 306 is depressed. Depending upon the position of switch 304, one of the time measuring devices, i. e., one of the pointers 301, 302, 303, will begin to function while condenser 131 is charged by the current passing the third photocell 135. As we have seen above, the charging time in this instance should be $T_0$, and this charging time can be adjusted by controlling the illumination falling from incandescent lamp 136 upon photocell 135. This is done by means of rheostat 137 which is actuated by handwheel 305. This handwheel is now adjusted until the charging time assumes the desired value.

In the second stage, the sensitivity of the device for light of the three primary colors is adjusted by means of handwheels 313, 314, and 315. These handwheels are mechanically connected to sliding contacts 129', 129" and 129'" of potentiometer 128, as shown in the lower left-hand part of Fig. 6. By means of these adjustments the voltage impressed upon condenser 122 and, therewith, upon potentiometer 121 is controlled. This adjustment in turn determines the voltage between the various electrodes 111 to 120 of the photo multiplier tube 82, and the sensitivity of this photo multiplier tube is a direct function of this voltage.

In order to adjust the color sensitivities, a filter of a primary color is placed upon the film stage of the enlarger, switch 304 is adjusted to the same color, and the charging time of condenser 131 is measured after push button 306 has been depressed. This charging time is indicated by one of the pointers 301, 302 or 303, and by manipulating the proper handwheel of the set 313, 314, 315, this charging time can be adjusted until the corresponding pointer of the set 301, 302, 303 indicates the correct light value.

What under these circumstances the correct light intensity value is, depends upon the assumptions under which the measurements are made, or upon the purpose to which this device is put. If the color measurements are made merely for comparative or statistical purposes, the simplest procedure is to adjust the color sensitivities in such a way that with the same setting of the enlarger, but with three different filters, respectively, upon its film stage, identical light intensity measurements are obtained by the three pointers 301, 302, 303. If, however, and this is the more probable case, the device is used to predict the appearance of color prints yet to be made, it is more advantageous to adjust the color sensitivities in such a way that the measured light intensities depend upon the respective color sensitivity of the photographic material upon which a print is going to be made. In other words, the sensitivities of photocell 82 for the three colors should have the same relation to each other as the corresponding sensitivities of the photographic emulsion upon which a print is to be made.

The absolute value of the measured intensities is of secondary importance as long as it is kept constant over the duration of the measurements. It can be, at least approximately, adjusted by placing a lamp of a known light output into the enlarger, observing carefully that this lamp is operated with the proper voltage, and adjusting the enlarger to a constant magnification ratio and the lens of the enlarger to a constant opening of the iris diaphragm. Under these circumstances, the light intensity upon the baseboard of the enlarger can be predetermined, and the three color sensitivities can then be adjusted until the three corresponding indicators of pointer 301, 302, 303, indicate the correct or approximately correct values.

The third stage of the adjustment is a little more complicated, since it involves the compensation for the errors caused by one primary color upon the measured intensities of the two other primary colors. In other words, we have six errors caused, respectively, by the unwanted contribution of the red light to the measured blue and green intensities, by the unwanted contribution of the green light to the measured red and blue intensities, and by the unwanted contribution of the blue light to the red and green intensities. These errors are, respectively, adjusted by handwheels 307 to 312 which control rheostats 330 to 335, shown in Fig. 6, but not in the same sequence, as pointed out above.

The compensations are performed by placing upon the film stage of the enlarger, Fig. 1, in place of a color transparency, a filter of one primary color, adjusting switch 304 to the same primary color and measuring, by depressing push button 306, the intensity of this color, then adjusting switch 304 to another primary color and measuring now the intensity of light of the first primary color penetrating the filter of the second primary color. If the filters were perfect, the light intensity would now be zero, or the corresponding charging time of condenser 131 would again be $T_0$. With actual filters this cannot be the case, and the measured light intensity will be larger than zero, and the charging time will be shorter than $T_0$. By manipulating the proper handwheel of the group 307 to 312, the charging time can be made to become $T_0$ again. In this case, the unwanted light of one primary color passing the filter of another primary color causes current to flow through the first photocell 82, thereby rendering the charging time of condenser 131 shorter than $T_0$. At the same time, however, this charging time is prolonged by the current passing the second photocell 320 and, if both factors cancel each other, the charging time $T_0$ is restored.

As an example, let us assume that we place a blue filter upon the film stage of the enlarger. Switch 304 is placed on "blue," push button 306 is depressed and the charging time of condenser 131 is measured. This charging time, or what is the same, the intensity of the blue light, is indicated by pointer 301.

Switch 304 is now placed on "green." Push button 306 is again depressed and the process is repeated. Due to the fact that some blue light penetrates the green filter, some current passes photocell 82, so that again a certain intensity is indicated, this time by pointer 302. The proper compensation to apply in this case is the one called "blue error," as applied to green light, in other words, handwheel 310 which is mechanically connected to rheostat 334. It is assumed that this rheostat 334 was at the beginning of the operation in a position that offered so much resistance to the current passing it, that lamp 323 did not emit any light. The rheostat is now manipulated until this lamp emits enough light to cause photocell 320 to pass sufficient current to prolong the exposure time of condenser 131 until it becomes $T_0$ again. In this case, of course, pointer 302 will again indicate zero light intensity, and this is how it should be, i. e., the blue light then contributes nothing to the measured intensity of the green light.

It can be seen schematically in Fig. 6 and in more detail in Figs. 7 and 11 that the light emitted by lamp 322 is also controlled by the diaphragm 342 which is mechanically connected to the "blue" time measuring device. In other words, the light that actually reaches photocell 320 depends upon the setting of rheostat 334, handwheel 310, as well as upon the setting of diaphragm 342 which in turn depends upon the setting of the "blue" light measuring device. Therefore, the current passing photocell 320 which prolongs the charging time of condenser 131 is proportional to the previously measured intensity of the blue light as expressed by the setting of diaphragm 342, multiplied by a factor which is indicated by the setting of rheostat 334 and which depends, as previously pointed out, upon the transmissivity of a filter of one color to light of another color and upon the respective sensitivity of the first photocell 82.

The same procedure is now repeated by placing switch 304 into the "red" position. Blue light penetrating the red filter impinges upon photocell 82, causing a reading of pointer 303. By manipulating, however, the handwheel 311, "blue error" as applied to red light, the charging time of condenser 131 can again be prolonged, so that it again becomes T₀. Handwheel 311 is operatively connected to rheostat 335 and again affects the brightness of the lamp 323. In this case, therefore, the light impinging upon photocell 320 depends upon the setting of rheostat 335, handwheel 311, as well as upon the setting of diaphragm 342 which in turn is again adjusted by the light measuring device.

Precisely the same procedure is performed for green and red light, by placing, respectively, green or red filters upon the film stage of the enlarger, first measuring the intensity of light of these primary colors penetrating filters of their own colors, and then measuring the light of these primary colors penetrating filters of the two other primary colors. These last two sets of measurements will then indicate the unwanted contributions of these two primary colors to the measured intensity of the two other primary colors, and by manipulating the proper compensations, handwheels 307 to 312 and rheostats 330 to 335, the charging times for the unwanted contributions can be correspondingly prolonged, until they again become T₀, so that the pointers 301, 302 and 303 register zero light values.

It is desirable to lock the shafts of the various adjustments after the proper positions have been arrived at which can be done by well known connections, such as set screws which, however, in the interest of simplicity have not been shown.

The device is now properly adjusted so that actual measurements can be taken. For that purpose a color transparency is placed on the film stage of the enlarger, and an enlarged image is projected upon the base plate 50. The photocell assembly 80 is then shifted until the point of the enlarged image which it is desired to analyze coincides with the aperture in the photocell housing.

The test procedure is complicated by the fact that in order to take a correct reading of the intensity of light of one color, the corresponding intensities of the two other colors must be known first. Or, in mathematical language, we have a set of three simultaneous equations which must be solved. Electrical or mechanical means for this purpose have been suggested and are applicable in this case, but in the interest of simplicity, I prefer another method which constitutes a step-by-step approximation and which merely involves the repeated application of the measuring procedure. Only relatively few applications or measuring cycles are necessary in order to arrive at a reasonably accurate approximation. This is due to the fact that the photocell is almost always more sensitive to light of one color than to light of the other colors, so that the corrections are not at all times of the same order of magnitude. It will be obvious that for that color for which a cell is most sensitive, the unwanted contributions of the two other colors for which the cell is less sensitive will be relatively small.

For example, in practice, the photocell is usually a great deal more sensitive to blue than to red or green, and if, therefore, the blue color is measured first, the errors introduced by the neglect of the contributions of the green and red colors are relatively small. If now, as a second color, the green color is analyzed, the result will be already somewhat more accurate because now the contribution of the blue color can be taken into consideration. This contribution is, at this time, still inaccurate due to the fact that the measured intensity of the blue color itself was an approximation, but it can be seen that the error now is only a second order error. In addition to this second order error, a first order error, of course, still afflicts the green reading because the red color has as yet not been measured. If we now measure the red color, both the unwanted contributions of the blue and green can be compensated for. These compensations are still inaccurate because of the inaccuracy of the blue and green measurements, i. e., again the red reading is now afflicted with two second order errors originating from the inaccurate blue and green readings, respectively.

We can now run through the entire cycle again. The blue error which is now obtained is much more correct than the first one, because we can now adjust the compensations in accordance with at least nearly correct green and red readings. The subsequently taken readings for the two other colors will be still more nearly accurate.

It is usually only necessary to run through two, or at the most three, cycles, in order to get results which have a perfectly acceptable degree of accuracy.

Simplified case of a predominantly blue sensitive photocell

Some of the most sensitive cells are so predominantly blue sensitive that both the red and green light contribute almost no errors to the blue reading but, of course, the green reading is afflicted by an unwanted contribution from the blue light and the red reading, in particular, is falsified by unwanted contributions from both the blue and green. The entire apparatus can then be simplified, and it can easily be seen that in this case we no longer have a set of three simultaneous equations, but merely three simple equations which can very easily be solved in the proper order. In particular, we have $$i_B = S_B t_{BB} L_B$$
$$i_G = S_G t_{GG} L_G + S_B t_{GB} L_B$$
$$i_R = S_R t_{RR} L_R + S_G t_{RG} L_G + S_B t_{RB} L_B$$

These equations can be transformed to read:

$$i_{B_0} = i_B$$
$$i_{G_0} = i_G - \frac{t_{GB}}{t_{BB}} i_{B_0}$$
$$i_{R_0} = i_R - \frac{t_{RG}}{t_{GG}} i_{G_0} - \frac{t_{RB}}{t_{BB}} i_{B_0}$$

The meanings of all symbols is the same as explained in the chapter headed "Mathematical relations and shape of diaphragm aperture."

The entire procedure becomes now very much simplified, since only one single measuring cycle is necessary. The blue light is measured first. Due to the fact that the red and green light make almost no unwanted contributions to the current passing the photocell, this reading is so nearly correct that no additional compensations are necessary. The blue time measuring device, however, actuates now the corresponding diaphragm 342, so that for the following measurements of the green light the blue error is compensated. This, in turn, gives a reading for the green light which is substantially correct, and the green time measuring device in turn adjusts the corresponding diaphragm 341, so that during the last period, when the blue light is measured, both the unwanted contributions originating from the green and blue light can be cancelled. Consequently during the last period when the red light is measured again a substantially correct reading is taken.

This means that on the panel of the main unit as shown on the right side of Fig. 1, handwheels 307, 308 and 309, can be omitted together with the potentiometers which are actuated by these handwheels, 307, 308, and 309 in Fig. 6. In this figure, lamp 321 and diaphragm assembly 340 can also be omitted.

It will be understood that the device as described in these specifications can be widely modified without departing from the principle of this invention. For example, while the summation of the unwanted contributions of light of two colors to the measured value of one color has been performed by merely illuminating the photocell 320 simultaneously by two lamps, separate photocells, if so desired, can be placed in front of these lamps, and the current passing these photocells can be added by electrical means, for example by connecting the corresponding photocells in parallel. Other changes and modifications will readily occur to those skilled in the art.

What I claim as new is:

1. A device for measuring the intensities of three primary colors of light forming a projected colored image, comprising: a set of three filters in three primary colors, respectively, adapted to be placed successively, one at a time, into the path of said light; a condenser; means to charge said condenser, comprising a photo-electric cell, adapted to be exposed successively to the light passing said filters, and a source of voltage operatively connected thereto; means to measure the time needed to increase the voltage of said condenser by a predetermined magnitude; means to prolong said time; and means to adjust said last named means, while said photo-electric cell is exposed to light of one primary color, in accordance with the intensity of the light of at least one of the two other primary colors; said time measuring means consisting of three units, each comprising a constant speed motor, a movable element, means to move said element by said motor while said condenser is being charged, means to stop said movement when the voltage of said condenser has reached a predetermined magnitude, and means to indicate the distance that said movable element has traveled during the charging period of said condenser, each of said three units adapted to measure the charging time of said condenser when said photo-electric cell is exposed to light of one primary color; said means to prolong the charging time of said condenser comprising a second photo-electric cell, independent of said first mentioned cell, the anode of the second cell connected to the positive and the cathode to the negative terminal of said condenser, and at least one lamp adapted to illuminate said second cell; said means to adjust said means to prolong said charging time comprising at least one adjustable diaphragm and a switch, said diaphragm placed, respectively, between said lamp and said second photo- electric cell and operatively associated with and actuated by one of said aforementioned movable elements, and said switch adapted to energize, when said first mentioned photo-electric cell is exposed to light of one primary color, at least one lamp which is placed behind a diaphragm operatively associated with one of said time measuring means adapted to measure the charging time of said condenser when said first mentioned photo-electric cell is exposed to light of another primary color.

2. A device for measuring the intensities of three primary colors of light forming a projected colored image, comprising: a set of three filters in three primary colors, respectively, adapted to be placed successively, one at a time, into the path of said light; a condenser; means to charge said condenser, comprising a photo-electric cell, adapted to be exposed successively to the light passing said filters, and a source of voltage operatively connected thereto; means to measure the time needed to increase the voltage of said condenser by a predetermined magnitude; means to prolong said time; and means to adjust said last named means, while said photo-electric cell is exposed to light of one primary color, in accordance with the intensity of the light of at least one of the two other primary colors; said time measuring means consisting of three units, each comprising a constant speed motor, a movable element, means to move said element by said motor while said condenser is being charged, means to stop said movement when the voltage of said condenser has reached a predetermined magnitude, and means to indicate the distance that said movable element has traveled during the charging period of said condenser, each of said three units adapted to measure the charging time of said condenser when said photo-electric cell is exposed to light of one primary color; said means to prolong the charging time of said condenser comprising a second photo-electric cell, independent of said first mentioned cell, the anode of the second cell connected to the positive and the cathode to the negative terminal of said condenser, and at least one lamp adapted to illuminate said second cell; said means to adjust said means to prolong said charging time comprising at least one adjustable diaphragm and a switch, said diaphragm placed, respectively, between said lamp and said second photo-electric cell, and comprising two diaphragm blades, movable relative to each other and defining a variable aperture between them, one of said blades being stationary and the other operatively connected to one of the aforementioned movable elements, and said switch adapted to energize, when said first mentioned photo-electric cell is exposed to light of one primary color, at least one lamp which is placed behind a diaphragm operatively associated with one of said time measuring means adapted to measure the charging time of said condenser when said first mentioned photo-electric cell is exposed to light of another primary color.

ALFRED SIMMON.

REFERENCES CITED

The following references are of record in the file of this patent:

UNITED STATES PATENTS

| Number | Name | Date |
| --- | --- | --- |
| 2,244,826 | Cox | June 10, 1941 |
| 2,483,452 | Berkley | Oct. 4, 1949 |